(12) United States Patent
Brown

(10) Patent No.: US 7,461,888 B2
(45) Date of Patent: Dec. 9, 2008

(54) SIDEWALL ASSEMBLY HAVING COMPOSITE PANELS FOR TRAILERS AND VANS

(75) Inventor: Donald Brown, Jonesboro, AR (US)

(73) Assignee: Trailmobile Corporation, Lake Forest, IL (US)

( * ) Notice: Subject to any disclaimer, the term of this patent is extended or adjusted under 35 U.S.C. 154(b) by 0 days.

(21) Appl. No.: 11/452,604

(22) Filed: Jun. 15, 2006

(65) Prior Publication Data

US 2006/0290170 A1 Dec. 28, 2006

Related U.S. Application Data

(63) Continuation-in-part of application No. 11/301,353, filed on Dec. 12, 2005.

(60) Provisional application No. 60/635,145, filed on Dec. 10, 2004.

(51) Int. Cl.
*B62D 33/04* (2006.01)

(52) U.S. Cl. .................................. 296/186.1; 296/181.3

(58) Field of Classification Search ............. 296/181.3, 296/181.6, 182.1, 186.1; 52/464, 459
See application file for complete search history.

(56) References Cited

U.S. PATENT DOCUMENTS

| | | | | |
|---|---|---|---|---|
| 3,393,920 A | * | 7/1968 | Ehrlich | 296/181.6 |
| 5,507,405 A | * | 4/1996 | Thomas et al. | 220/1.5 |
| 5,992,117 A | * | 11/1999 | Schmidt | 52/582.1 |
| 6,505,883 B1 | * | 1/2003 | Ehrlich | 296/181.6 |
| 6,527,335 B1 | * | 3/2003 | Yurgevich | 296/186.1 |
| 6,626,622 B2 | * | 9/2003 | Zubko | 410/113 |
| 6,832,808 B1 | * | 12/2004 | Bennett | 296/186.1 |
| 2002/0109377 A1 | * | 8/2002 | Ehrlich | 296/191 |
| 2002/0180238 A1 | * | 12/2002 | Sill | 296/181 |
| 2004/0232728 A1 | * | 11/2004 | Smidler | 296/186.1 |
| 2006/0061136 A1 | * | 3/2006 | Pines | 296/186.1 |
| 2006/0071507 A1 | * | 4/2006 | Graaff et al. | 296/186.1 |
| 2007/0110538 A1 | * | 5/2007 | Roush et al. | 410/115 |

* cited by examiner

*Primary Examiner*—Jason S Morrow
(74) *Attorney, Agent, or Firm*—Edward D. Gilhooly

(57) ABSTRACT

A sidewall assembly for a trailer or van having a plurality of composite panels interconnected along the length of the trailer. The composite panels have a polyurethane core sandwiched between inner and outer metal panels in bonded relationship. The composite panels are affixed to a respective hat-shaped inner side post between adjacent vertical ends of the composite panels. A plurality of vertically arranged rivets affixes the composite panel to inner post and to an outer sidepost.

4 Claims, 9 Drawing Sheets

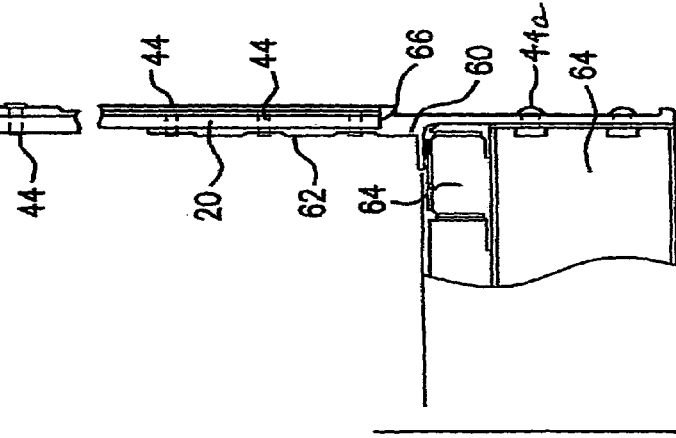
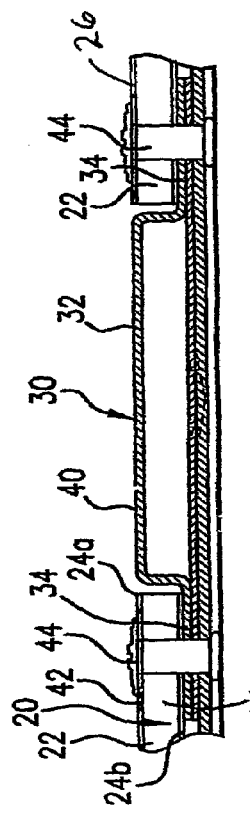
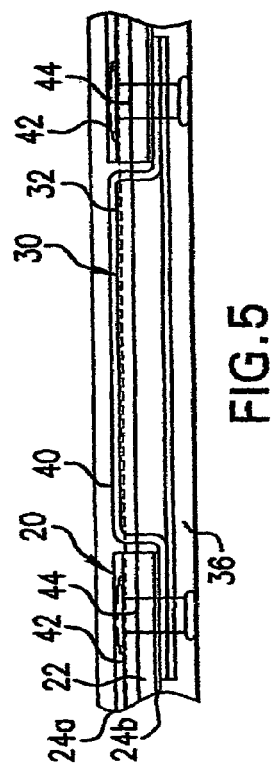
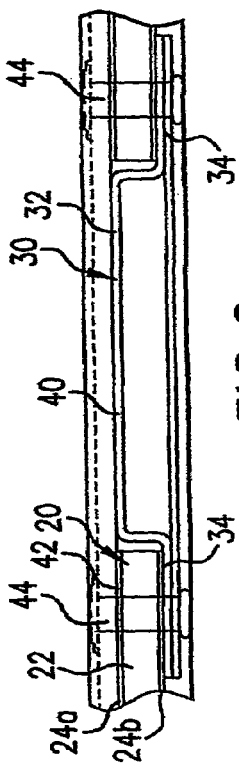

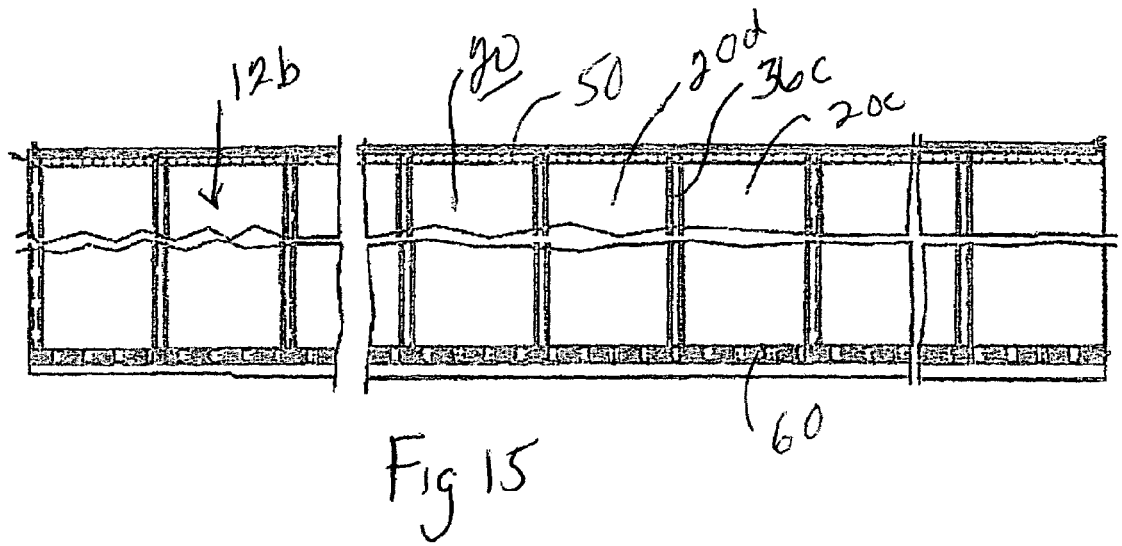
Fig 15
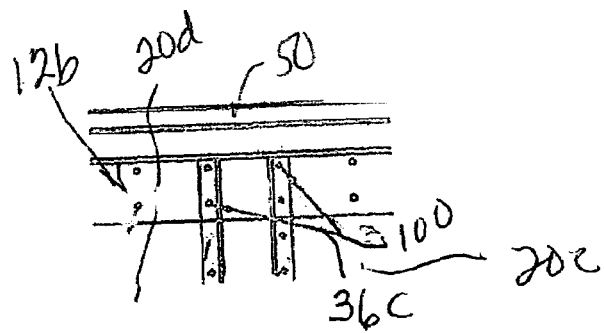
Fig 16
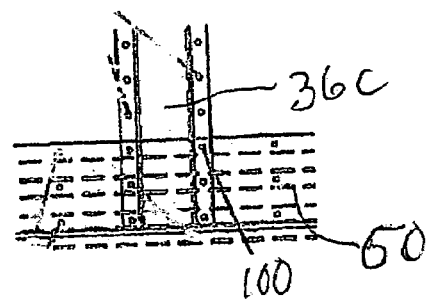

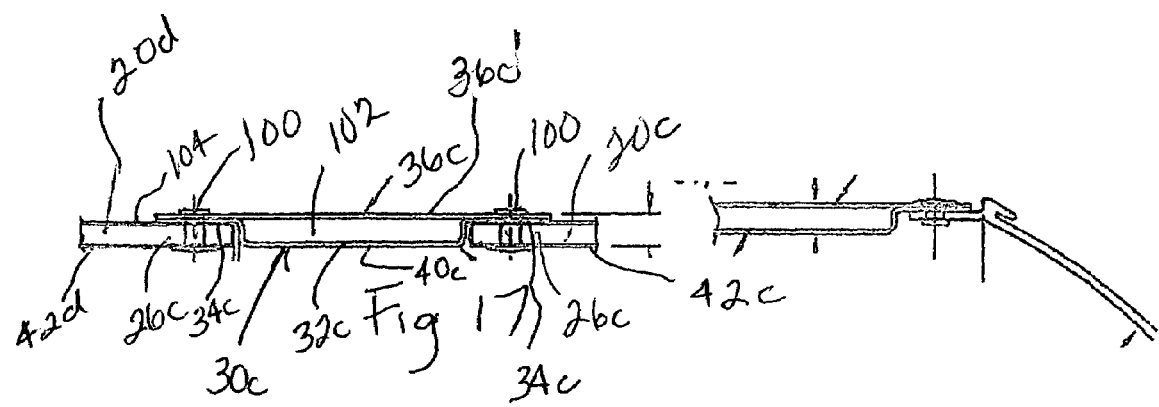
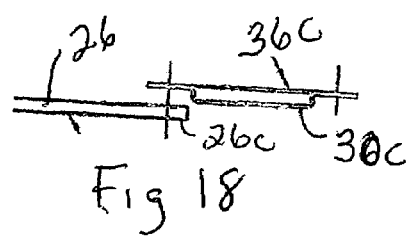

US 7,461,888 B2

SIDEWALL ASSEMBLY HAVING COMPOSITE PANELS FOR TRAILERS AND VANS

This application is a continuation-in-part of non-provisional application Ser. No. 11/301,353 filed Dec. 12, 2005 which in turn claims priority to U.S. provisional application No. 60/635,145 filed Dec. 10, 2004.

BACKGROUND OF THE INVENTION

1. Field of the Invention

This invention relates in general to trailers and, more particularly, to a trailer having a sidewall assembly including composite panels interconnected by side posts.

2. Summary of the Prior Art

A common form of a cargo carrying trailer or van relies on a sheet and post design for its sidewall construction. Known sheet and post designs employ a plurality of hat-shaped side posts to which outer and inside metal side sheets are riveted by a vertical array of rivets. Such sheet and post trailers do not optimize interior cargo space because of the width of the sidewall structure. Many prior attempts to reduce the thickness of the sidewall of a trailer have suffered from several disadvantages, including extra weight, higher repair costs and designs that are not optimumly strong under all loading conditions. Prior art post and sheet sidewall constructions are also not efficiently durable and are not economical to manufacture and repair. Accordingly, it is desirable to provide a trailer having a sidewall assembly that is economical to manufacture and to operate, is durable during use, and provides a reduced sidewall thickness to increase cargo space and reduce weight.

SUMMARY OF THE INVENTION

It is an objective of this invention to provide a trailer having a sidewall assembly formed of a plurality of composite panels that reduce the thickness and weight of the side structures. The composite panels of the invention comprise a polyurethane core thermally bonded to inner and outer metal panels or skins. The edge portions of each of the composite panels are respectively riveted to a plurality of side posts having a hat-shaped sectional cross section and to outer posts. The inner surface created by the composite panels and the intervening surfaces of the side posts create a generally smooth and snag free surface. The sidewall assembly herein disclosed is strong, durable, and lightweight, and is easily repaired.

BRIEF DESCRIPTION OF THE DRAWINGS

FIG. 4 is a partial top plan view, with parts in section, of the first embodiment of the sidewall assembly of the invention at the upper side rail;

FIG. 5 is a partial top plan view, with parts in section, of the sidewall assembly of the invention at an outer side post;

FIG. 6 is a partial top plan view, with parts in section, of the first embodiment of the sidewall assembly of the invention at the lower side rail;

FIG. 7 is an end elevational view, with parts in section, of the sidewall assembly of the invention as used in the trailer of FIG. 1;

FIG. 15 is a partial side elevational view of a third embodiment of the invention of the sidewall assembly of the invention employing flat outer posts;

FIG. 16 is a partial side elevational view of the outer side post of the invention;

FIG. 17 is a partial top plan view, with parts in section, of a third embodiment of the sidewall assembly of the invention showing the interconnection of adjacent composite panels; and FIG. 18 is a partial to view of the inner and outer posts and an end portion of a composite panel prior to assembly.

DESCRIPTION OF THE PREFERRED EMBODIMENTS

Figure 1:
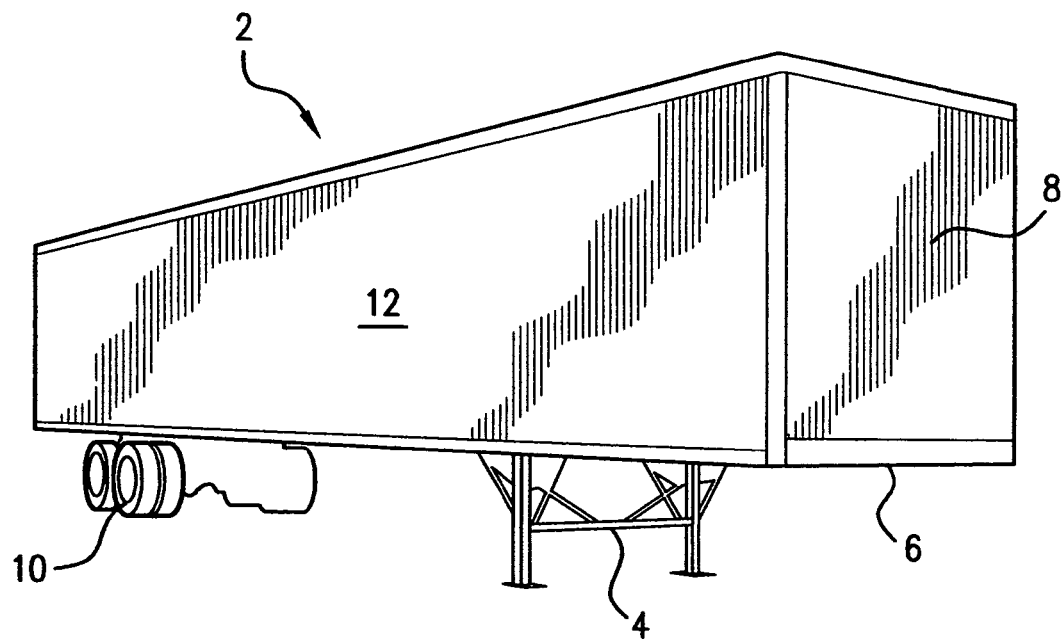
FIG. 1 is a perspective view generally showing one type of trailer that includes the features of the present invention.
Figure 2:
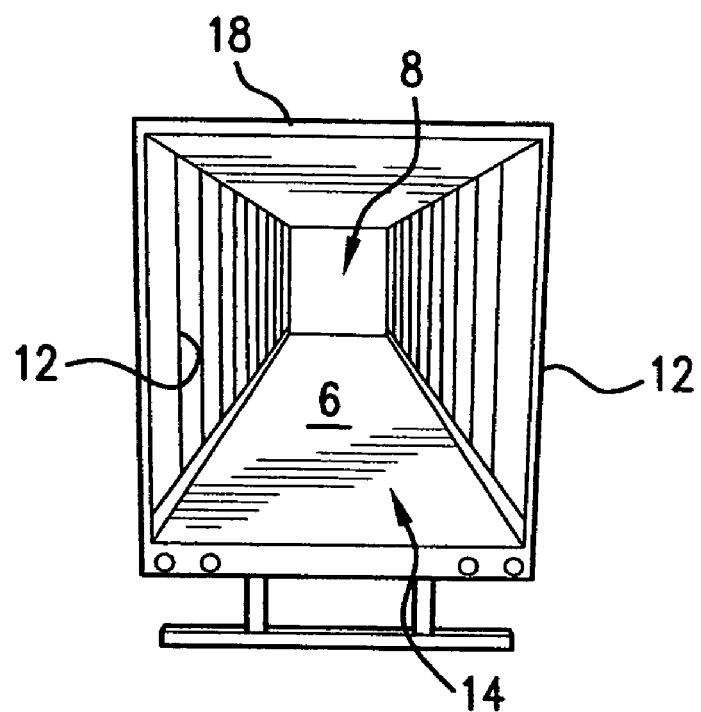
FIG. 2 is a rear perspective view of the interior of the trailer of FIG. 1.
Figure 3:
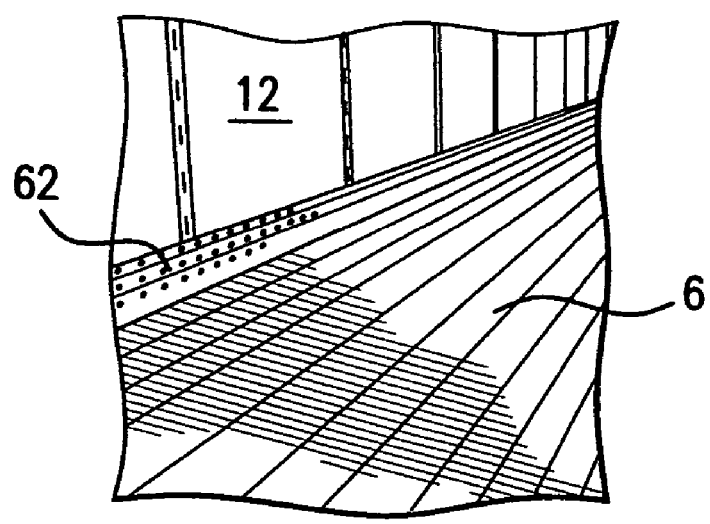
FIG. 3 is a side perspective view of the floor and sidewall assembly of the trailer of FIG. 1.

Referring now to FIG. 1-12, there is illustrated a first embodiment of the composite sidewall assembly of the invention to be described in detail herein. In FIG. 1, a general perspective view of a trailer embodying the teachings of the invention is shown. The present invention is not restricted to the particular trailer shown in FIG. 1, but more broadly relates to the construction of cargo containers, including, but not limited to, trailers, vans and the like. In FIG. 1, trailer 2 includes a standard landing gear 4, a floor 6 and a front wall 8. Conventional wheel assemblies 10 are provided at the rear of the trailer 2. The trailer is further provided with the sidewall assembly 12 of the invention to be described more fully herein. Referring to FIGS. 2 and 3, the interior cargo space 14 of the trailer 2 is defined by floor 16, sidewall assemblies 12 on opposite sides of trailer 2, roof 18 (FIG. 2), and front wall 8.

Referring now to FIGS. 4-11, details of the first embodiment of the composite wall assembly 12 of the present invention is best shown. In FIGS. 4, 5, 6, and 7, sidewall assemblies 12 include a plurality of vertically extending composite panels 20 substantially disposed longitudinally along the length of the sidewall assemblies 12. Each of the composite panels 20 have a flat, rectangular shape and include a non-metallic core 22, formed from polyurethane and the like, sandwiched respectively between prepainted inner and outer panels 24*a* and 24*b*. The panels 24*a*, 24*b* may be formed from steel or other strong, durable metal as desired. The panels 24*a*, 24*b* are thermally molecularly bonded to core 22 to ensure structural integrity of each composite panel 20 and the overall sidewall assembly 12. The panels 24*a* and 24*b* are advantageously painted white or other bright color to brighten the interior of space 14 and the exterior of trailer 2.

Adjacent vertical end portions 26 of composite panels 20 are interconnected as a sidewall unit by intervening metal inner side posts 30 vertically extending within cargo space 14 (FIGS. 2 and 3). The side posts 30 have a hat-shaped horizontal cross section forming a central portion 32 and opposite offset edge portions 34. The edge portions 34 are offset from central potion 32 by a distance approximately equal to the thickness of composite panel 20. The vertical end portions 26a of the composite panels generally overlap offset portions 34 in contacting relationship as seen m FIGS. 4-6. Outer posts 36 (FIGS. 5, 11 and 12) are mounted exteriorly over each of the inner posts 34 and includes a slight bulge 38 for strength. The outer surfaces of the offset portions 34 contact the inner surface of a respective outer post 36. The inner surface 40 of inner post 30 is generally vertically coplanar to the vertical inner surface 42 of panel 20 to form a generally continuous, snag proof surface. The edge portions of panel 20, edge portions 34 of inner side post 20 and the outer post 36 are interconnected as a durable and strong unit by rows of vertically extending arrays of rivets extending the height of sidewall assemblies 12. The central portion 32 of inner side posts 30 are spaced from outer posts 36.

Figure 8:
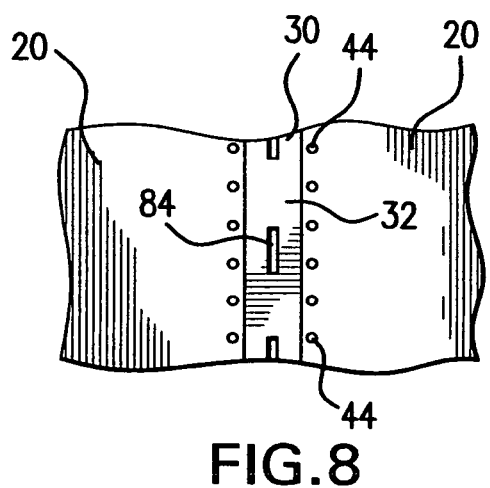
FIG. 8 is a partial side elevational view of a inside post connecting adjacent composite side panels of the sidewall assembly of the invention.
Figure 9:
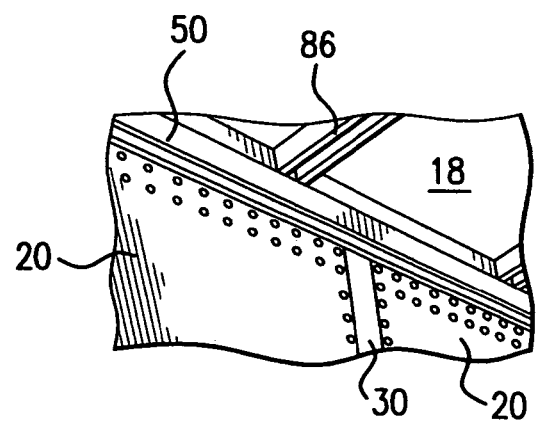
FIG. 9 is an upper perspective view of the intersection of roof and sidewall assembly of the invention.
Figure 10:
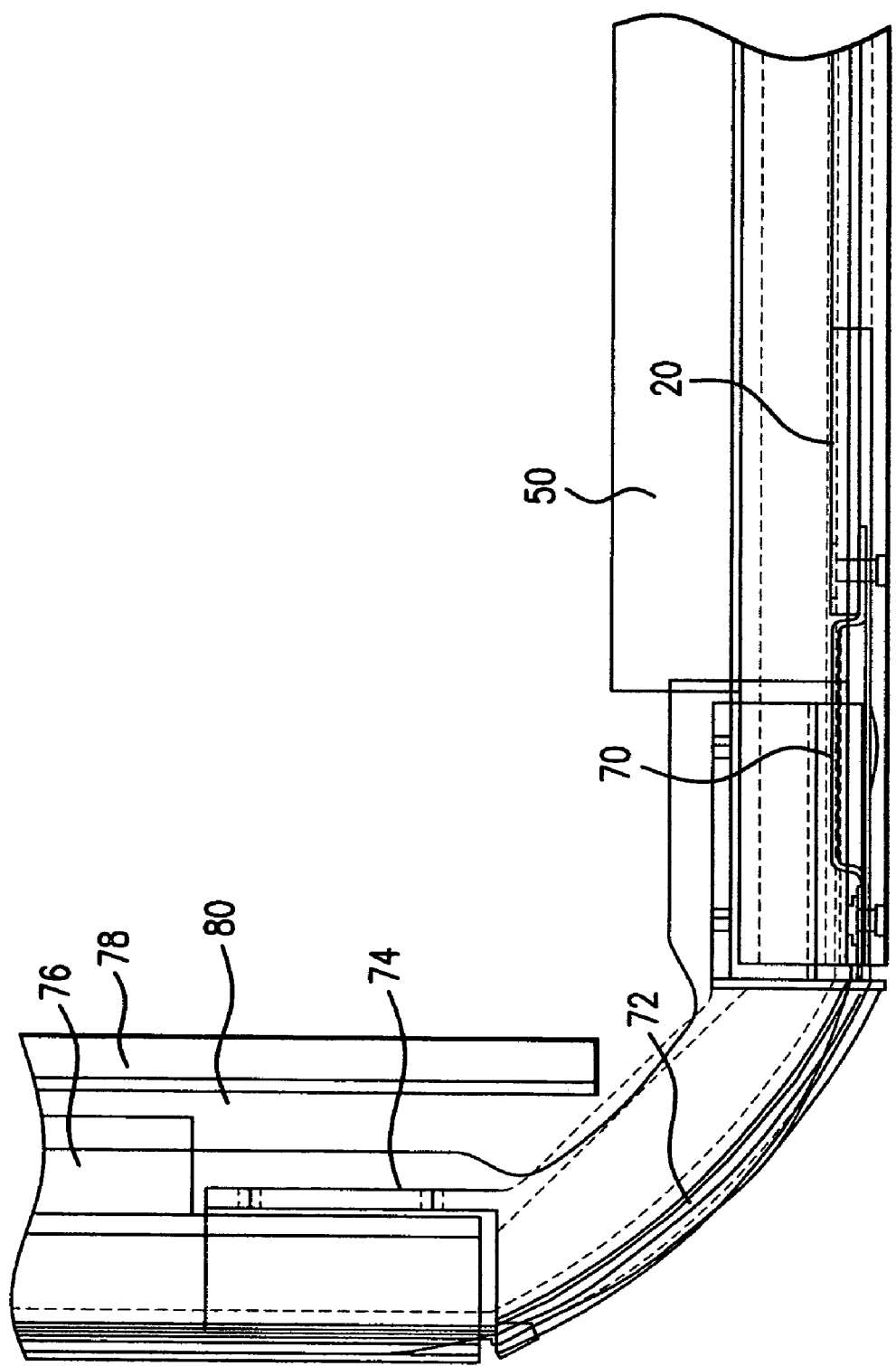
FIG. 10 is a partial top plan view, with parts in section, of the front corner of the trailer of FIG. 1.
Figure 11:
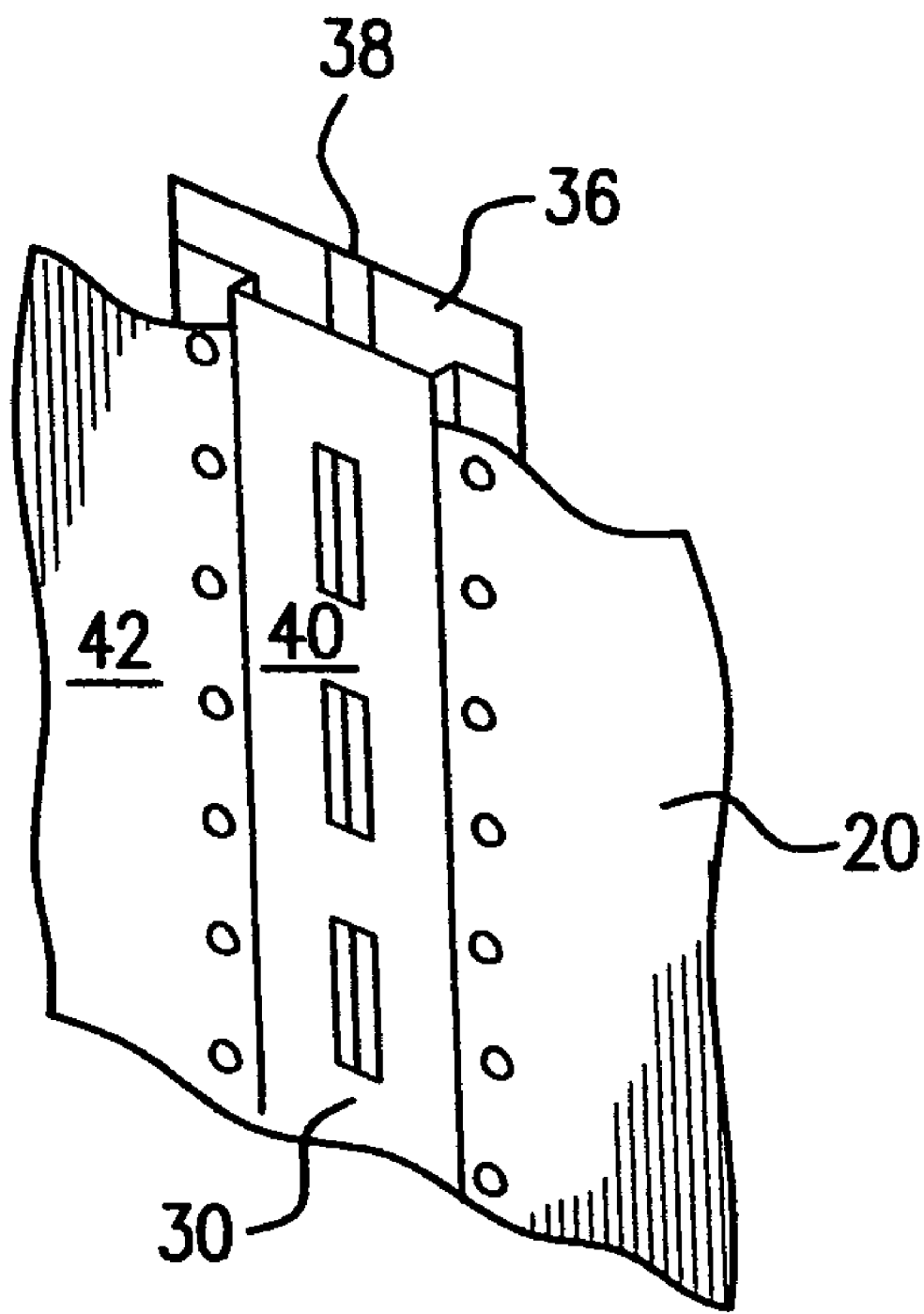
FIG. 11 is a side perspective view of the panels and inner and outer side posts of the first embodiment of the sidewall assembly of the invention.
Figure 12:
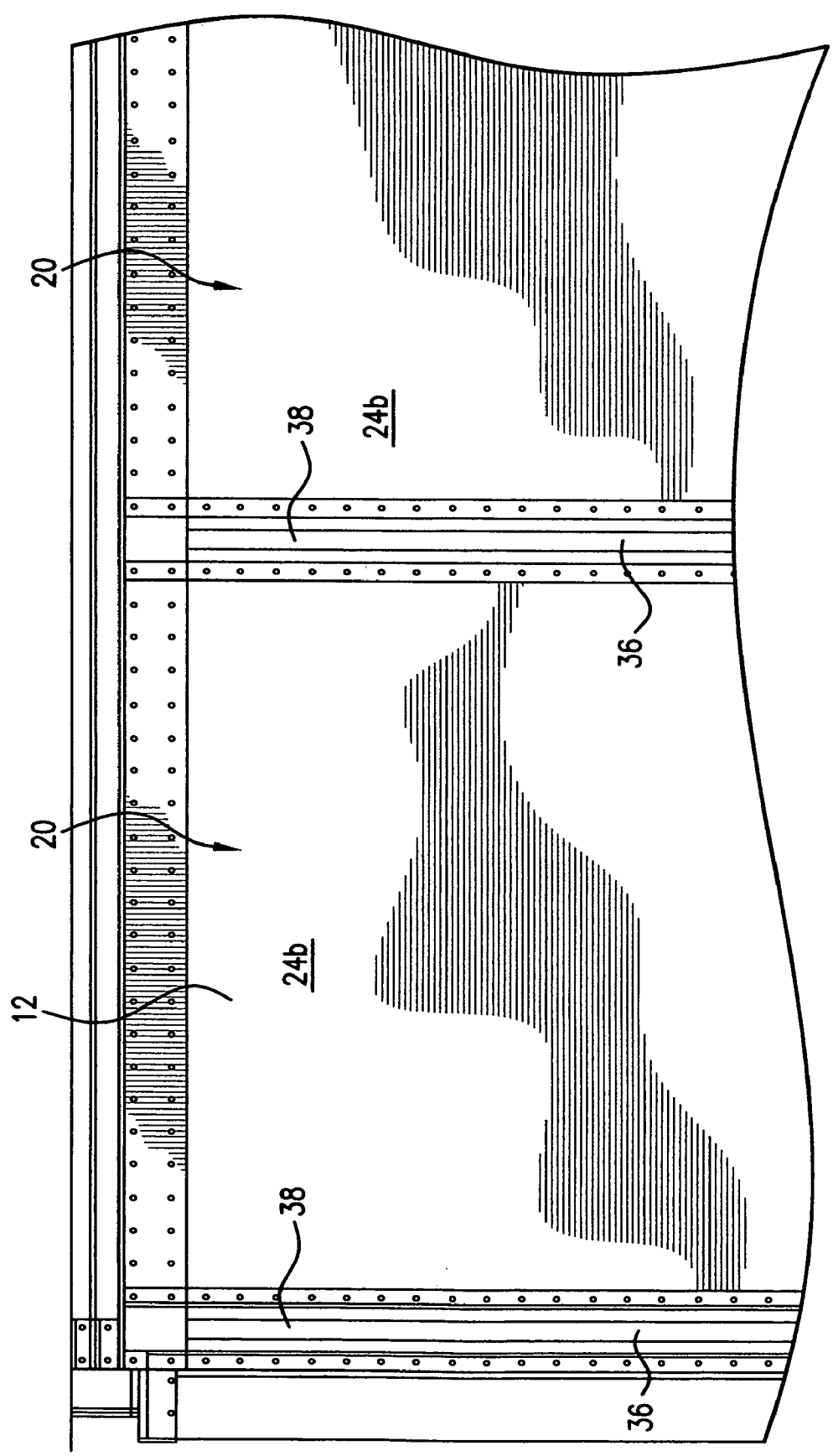
FIG. 12 is a partial side elevational view of the first embodiment of the sidewall assembly of the invention.

The upper portions 20a (FIG. 7) of panels 20 are attached to an upper rail 50 by rivets 52 extending through an overlap 54 of upper rail 50 and the panels 20. A standard roof and roof bow 56 are mounted on the upper rail 50. A bottom rail 60 is integrally attached to the side wall assembly 12 by rivets 44a and form lower interior scuff surface 62 (FIG. 3). A standard floor and cross member is affixed by rivets to the bottom rail 60. As should be apparent in FIG. 7, the panels 20 and inner posts 30 overlap the bottom rail 50 for a shingle style design at area 66. In FIG. 10, there is illustrated the front corner of trailer 2. The front composite panel 20 is riveted to the rear edge portion of a front hat-shaped post 70 below the upper sidewall rail 50. The post 70 is connected to radius extrusion 72 that is affixed to a comer casting 74. The front wall further includes an upper front rail 76, an interior bulkhead and front wall 78 and a front wall post 80. As shown in FIG. 8, the central portion of 32 of side posts has a series of vertical slots 84. In FIG. 9, the upper chord 50 interconnects with horizontal beams 86 of the roof.

Figure 14:
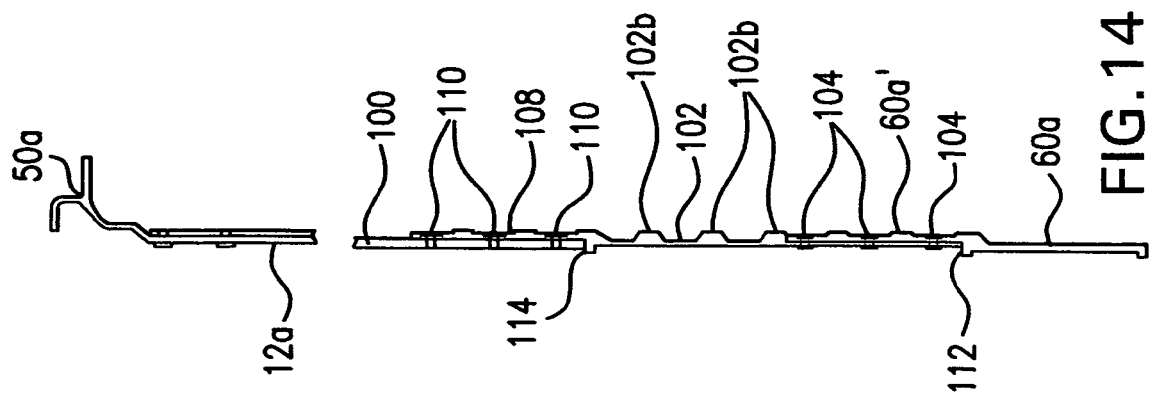
FIG. 14 is an end elevational view of the sidewall assembly of FIG. 13.
Figure 13:
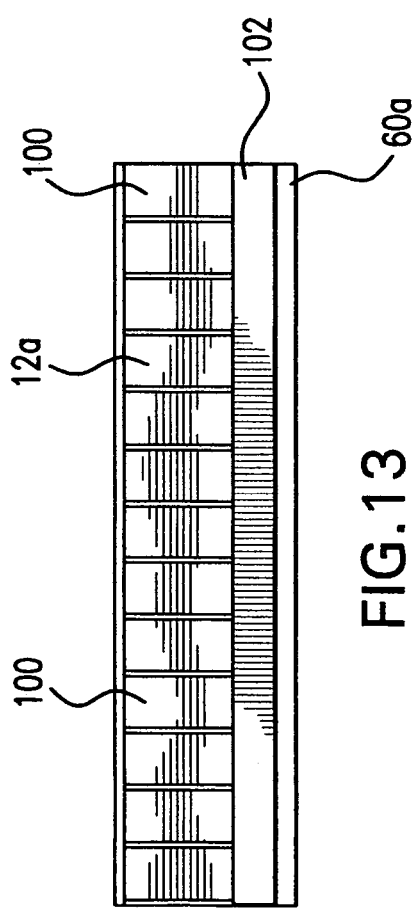
FIG. 13 is side elevational view of a second embodiment of the sidewall assembly of the invention.

Referring now to FIGS. 13-14, there is illustrated a second embodiment of the composite sidewall assembly of the invention, generally designated by reference numeral 12a. The sidewall assembly 12a includes composite panel assembly 100 of the same construction as described with reference to the first embodiment of FIGS. 1-12. The sidewall assembly 12a is further provided with a scuff plate 102 that is affixed by fasteners 104, such as three in number situated at a plurality of stations along the length of the sidewall assembly 12a, at its lower edge portion 106 to bottom rail 60a. The lower edge portion is situated exteriorly of the offset upper section 60a' of the bottom rail 60a. The upper portion 108 of scuff plate 102 is offset and extends in rear contacting relationship with the bottom of the side wall assembly 12a. The upper portion 108 is attached to the bottom of the side wall by an upper series of mechanical fasteners, such as three in number at each vertical location as shown in FIG. 14. The scuff plate 102 has a plurality of rear rib like projections 102b to strengthen the scuff plate and the sidewall assembly as a whole. The upper portion of the rail 60a is provided with a ledge 112 to interfit with the bottom edge of the scuff plate. A ledge 114 is formed on an upper portion of scuff plate 102 to contact the bottom of the sidewall assembly 12a. The scuff plate 102 provides a heavy duty structure that strengthens the sidewall and resists damage from external forces, such as, for example, from fork lifts and the like that typically lift trailers on and off railcars and other locations during use.

Referring now to FIGS. 15-18, there is illustrated a third embodiment of the sidewall assembly of the invention, generally designated by reference numeral 12b, and having composite panels for trailers and vans. The embodiment of FIGS. 15-18 is similar to what was described with reference to FIGS. 1-14, but includes an improved technique of interconnecting adjacent composite panels 20c,d forming the sidewall assembly 12b. The composite panels 20c,d are formed with a pair of metal sheets between which a polyethylene plastic with a foam core of 25-30% is present and is thermally bonded. It is within the scope of the invention to use other foam percentages where suitable or other plastics both based on strength, design or economic conditions encountered.

Adjacent vertical end portions 26c of composite panels 20c, d are interconnected as a sidewall unit by intervening metal inner side posts 30c. as seen in FIG. 17. The side posts 30c have a hat-shaped horizontal cross section forming a central portion 32c and opposite offset edge portions 34c. The edge portions 34c are offset as wings from central potion 32c by a distance approximately equal to the thickness of a composite panel 20c, d. The vertical end portions 26c of the composite panels generally overlap offset portions 34c as seen in FIG. 17. The inner surface 40c of inner post 30c is generally vertically coplanar to the vertical inner surface 42c, d of adjacent panels 20c,d to form a generally continuous, snag proof surface.

Outer posts 36c (FIGS. 17 and 18) are mounted exteriorly over each of the inner posts 34 and the panels 20c, d. The outer posts are a plurality of flat plate members that extend between the upper rail 50 and bottom rail 60 between adjacent composite panels 20c,d as seen in FIGS. 15 and 16. The outer surfaces of the offset wing portions 34c of the inner post 30c contact the inner surface of a respective outer post 36. The edge portions of panel 20c, d, edge portions 34c of inner side post 30c and the outer post 36 are interconnected as a durable and strong unit by rows of vertically extending arrays of rivets 100 extending generally the height of sidewall assemblies 12c. The central portion 32c of inner side posts 30c are spaced from the inner surface of outer posts 36 to form a space 102 for logistic elements (not shown). The exterior surface 36c' lies in a plane lies in a plane outward from the outer surface of the composite panels 20c, d. In FIG. 18 the unattached arrangement of the inner post 30c and outer post 36b in conjunction with an edge portion oft a composite panel is shown to illustrate the ease of interconnecting the elements as a unit during assembly of the sidewall.

What is claimed is:

1. A sidewall assembly for a transporting vehicle comprising
   a side wall including a plurality of composite panels having a non-metallic material imposed between a pair of sheets and extending vertically along a horizontal axis, said composite panels having vertical flat edge portions,
   a plurality of inner side posts vertically positioned between adjacent pairs of said plurality of composite panels,
   said inner side posts having a shaped horizontal cross-section forming a flat central surface and a pair of opposite offset edge portions forming flat inner surfaces and outer surfaces, said offset edge portions being offset from said flat central surface by a distance generally equal to thickness of said vertical flat edge portions,
   a plurality of outer vertical flat side posts being vertically positioned in generally contacting relationship with said outer surfaces of said plurality of inner side posts, and
   mechanical fasteners for interconnecting said vertical edge portions of each plurality of composite panels, said offset portions of said plurality of inner side posts, and said plurality of outer side posts together as a unit with said vertical edge portions of said composite panels generally contacting said inner surfaces of said offset portions of said inner side posts and said flat outer surface of said inner side posts generally contacting a portion of said flat outer posts.

2. The sidewall assembly according to claim 1 wherein each of said plurality of composite panels includes a non-metallic core sandwiched between metal inner and outer metal panels.

3. The sidewall assembly according to claim 2 wherein said non-metallic core is polyurethane.

4. The sidewall assembly according to claim 2 further including a lower scuff plate, said scuff plate having a offset upper portion extending in rear contacting relation with lower portions of said composite panels, and said scuff plate having strengthening means adjacent said lower portion of said composite panels.

\* \* \* \* \*